United States Patent Office 3,116,905
Patented Jan. 7, 1964

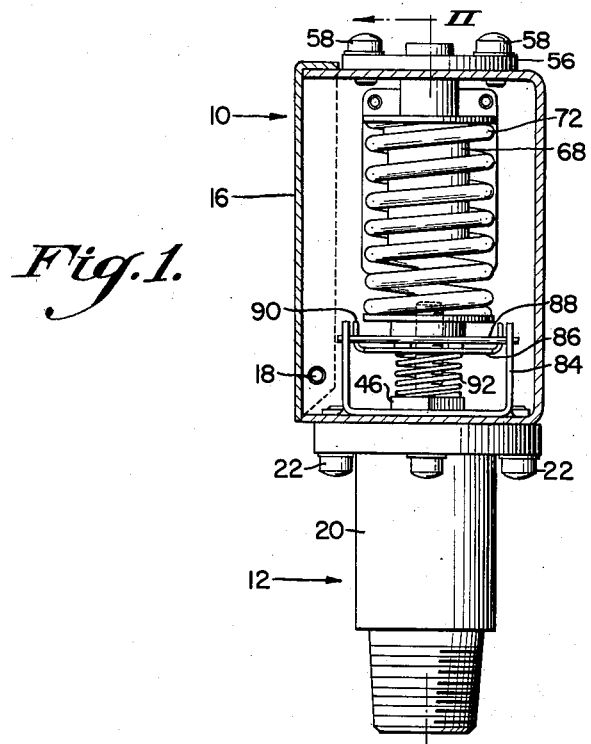
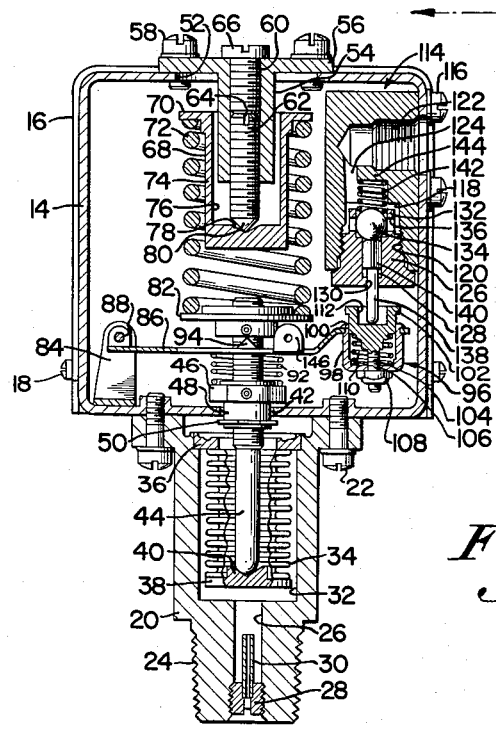

3,116,905
PRESSURE RESPONSIVE VALVE DEVICE
Louis M. Puster and Joseph P. Wagner, Knoxville, Tenn., assignors to Robertshaw Controls Company, a corporation of Delaware
Filed Feb. 15, 1961, Ser. No. 89,492
2 Claims. (Cl. 251—58)

This invention relates to condition responsive devices for controlling variable pressure conditions in a system.

It is an object of this invention to monitor a variable pressure condition continuously and to warn of impending unsafe variations of the condition.

Another object of this invention is to monitor a variable condition whereby a pressure signal will automatically be produced when the variable condition exceeds normal operating conditions.

A further object of this invention is to monitor various pressure variables in a system, such as a pneumatic control system, so that if the variable exceeds a safe limit, pressure will be vented from the system effecting a warning signal or a shut down of the system.

Briefly, the invention comprises a two-position, normally-closed, snap-acting valve responsive to a pressure signal. The device is equipped with a range adjustment as well as a differential adjustment. The two-position, snap-acting valve opens with a rising pressure signal to vent the system or release a pressure signal and, as an alternative, can be made to open with a falling pressure signal.

The invention will now be described with reference to the accompanying drawings in which:

FIG. 1 is a partial sectional view of the pressure transmitter; and

FIG. 2 is a view taken along line II—II of FIG. 1.

Referring to the drawings, there is illustrated a transmitter assembly 10 and a pressure measuring assembly 12. Transmitter assembly 10 includes a casing 14. A cover 16 is attached to casing 14 by screws 18 to provide access to the interior of the casing. Pressure measuring assembly 12 includes a housing 20 which is joined to casing 14 by screws 22.

Referring now to FIG. 2, the housing 20 is provided with an externally threaded connection 24 having a bore 26 therein. An orifice plug 28 is threaded into bore 26 and an orifice tube 30 is inserted into the orifice of plug 28. The monitored pressure passes through the small opening in orifice tube 30 which serves as a pulsation dampener.

Bore 26 communicates with a chamber 32 having a bellows 34 mounted therein. One end of bellows 34 is mounted on a bellows head 36 which is attached to the walls of chamber 32 by conventional means, such as welding. Bellows 34 has a movable end wall 38 which has a conical seat 40 formed on its inner side for receiving the end of an actuating stem.

An aperture 42 in the bottom wall of the transmitter casing 14 provides communication between chamber 32 and the interior of transmitter casing 14. An actuating stem 44 projects through aperture 42 and seats at one end on conical seat 40 in end wall 38 of bellows 34. A stop nut 46 is threaded onto actuating stem 44 and limits the downward movement of actuating stem 44 by engaging the bottom inside wall of the transmitter casing 14. Stop nut 46 has a cylindrical boss 48 projecting therefrom through aperture 42 and an annular groove is formed on boss 48 to receive a snap ring 50. Snap ring 50 is larger in diameter than aperture 42 and limits movement of actuating stem 44 in an upward direction by engaging the bottom outside wall of the transmitter casing. Undue stressing of the bellows due to overtravel is thus prevented by the described limit stops.

Transmitter casing 14 has an opening 52 in its upper wall opposite aperture 42 for receiving a range adjustment fitting 54. Fitting 54 has a flange 56 which is attached to the outer wall of the transmitter casing 14 by screws 58. Fitting 54 has a threaded bore 60 and a range spring adjustment screw 62 is received therein. Adjusting screw 62 has a screwdriver slot 64 in the upper end thereof. A screw 66 is provided to plug the bore 60 above adjusting screw 62.

An upper spring seat member 68 has a flange 70 which provides a seat for one end of range spring 72. Spring seat member 68 has a body portion 74 having a cylindrical recess 76 therein. A conical recess 78 is formed in the bottom wall of recess 76 for receiving the pointed end 80 of adjusting screw 62. The pointed end of the conical seat prevents translation of side forces as a result of misalignment, etc. Body portion 74 of spring seat member 68 extends axially inside the coils of range spring 72, thereby preventing spring 72 from buckling in a lateral direction. Sufficient clearance is provided between the walls of recess 76 and the outer wall of fitting 54 to allow the parts to freely move relative to each other. The other end of range spring 72 is seated against a lower spring seat member 82 which is threadedly attached to the upper end of actuating stem 44. It is readily seen that the pressure range to be monitored is determined by the bias of range spring 72 on bellows 34 and that this bias is adjustable by screw 62.

Mounted on the bottom inner wall of the transmitter casing 14 is a U-shaped support bracket 84. A lever 86 is pivotally mounted on the arms of bracket 84 by pin 88 which passes through openings in a pair of ears 90 on lever 86. Actuating stem 44 loosely projects through an aperture in the central portion of lever 86. A spring 92 encircles actuating stem 44 and is seated at one end against the underside of lever 86 and at the other end against stop nut 46. Lever 86 is provided with a pair of upwardly projecting knife-edge pivots 94 which bear against the underside of spring seat member 82. Spring 92 biases pivots 94 into engagement with spring seat member 82 as stem 44 travels axially in the casing. Axial movement of actuating stem 44 causes lever 86 to pivot with respect to bracket 84 about pin 88 and with respect to spring seat member 82 about pivots 94.

Attached to the outer end of lever 86 is a differential assembly 96. Differential assembly 96 comprises a cup-shaped housing 98 having a shoulder 100 on the upper wall thereof to which lever 86 is securely staked. A plunger member 102 has a threaded stem 104 which loosely projects through an aperture 106 in the bottom wall of housing 98. Plunger member 102 is closely guided by the inner wall of housing 98. A nut 108 is threaded on to stem 104 to secure the parts together and also provides a means for adjusting the compression on a differential spring 110. Differential spring 110 is mounted in housing 98 with its lower end seated against the bottom wall of the housing and its upper end seated against plunger member 102. A cylindrical recess 112 is formed in the upper wall of plunger member 102 for receiving a valve operating stem 133. Differential assembly 96 serves as a snap-acting device in a manner to be described below.

A valve body or casing 114 is mounted on one wall of casing 14 by screws 116. A chamber 118 is formed in body 114 and communicates with an internally threaded opening 120 in the lower end of body 114. An internally threaded opening 122 is formed in the upper portion of body 114 and is connected with chamber 118 by a passage 124. A valve seat member 126 is threadedly received in opening 120.

Member 126 is provided with a passage 128 having a reduced opening 130 at the lower end forming a shoulder. Projecting from the upper end of member 126 into chamber 118 is a cylindrical sleeve extension 132 having a common axis with passage 128. The inner diameter of sleeve extension 132 is larger than the diameter of passage 128.

A poppet valve 134, in the form of a ball, is received in sleeve extension 132 and seats on the shoulder formed by the junction of passage 128 with the internal opening of sleeve 132. Valve 134 is closely guided by the inner wall of sleeve 132. Transverse openings 136 are drilled in the wall of sleeve 132 to allow fluid to flow freely into passage 128 when valve 134 is unseated.

A valve operating stem 138 has an upper non-circular portion 140 received in passage 128. Non-circular portion 140 is closely guided by the walls of passage 128 and, being larger than reduced opening 130, serves to retain stem 138 in passage 128. The space between the flat walls of portion 140 and the circular wall of passage 128 allows fluid to flow freely through passage 128. The lower portion of stem 138 projects loosely through opening 130 with sufficient clearance to allow fluid to flow freely through opening 130.

A return spring 142 has one end seated against valve 134 and the other end seated against a wall 144 in the chamber 118. Return spring 142 biases valve 134 against its seat over passage 128. Thus, when pressure is supplied to chamber 118 from inlet opening 122 through passage 124, valve 134 is biased against its seat by both the fluid pressure in chamber 118 and return spring 142.

In operation, the pressure to be monitored is supplied to chamber 32 through connector 24. Pressure is supplied to chamber 118 through inlet 122. With valve 134 seated due to the bias of spring 142, and with chamber 118 pressurized, the resulting pressure drop across valve 134 exerts an additional closing force on valve 134 to that exerted by spring 142.

As the pressure in chamber 32 approaches the predetermined safe limit, bellows 34 begins to contract, which in turn causes actuator stem 44 to move upwardly against the bias of range spring 72. Spring 92 causes lever 86 to follow the movement of actuator stem 44 and the upward movement of actuator stem 44 causes lever 86 to rotate in a counterclockwise manner. Counterclockwise movement of lever 86 moves differential assembly 96 upward until valve operating stem 138 is received in recess 112 of plunger member 102.

Continued upward movement of differential assembly 96 causes differential spring 110 to contract against the combined force on valve 134 exerted by spring 142 and the pressure in chamber 118. Differential spring 110 continues to contract to the point where it exerts a force equal to the closing force on valve 134. When this occurs, further upward movement of the differential assembly unseats valve 134.

A soon as valve 134 is unseated, the fluid pressure acting on it is equalized, thus reducing the closing force to that exerted by spring 142. This sudden reduction of force against differential spring 110 causes it to expand suddenly and snap valve 134 to the fully open position and the pressure in chamber 118 is vented through opening 130.

Should the pressure in chamber 32 continue to rise after valve 134 has been unseated, actuator stem 44 will continue to move upwardly until snap ring 50 engages the bottom wall of the transmitter casing 14, thereby preventing damage to the bellows due to overtravel. If valve 134 reaches the limit of its travel before snap ring 50 engages the transmitter casing to stop the travel of actuator stem 44, overrun spring 92 contracts, thereby preventing damage to the valve assembly, differential assembly, and lever 86.

With a decrease in monitored pressure in chamber 32, lever 86 rotates clockwise about its pivot until poppet valve 134 returns to its seat. However, since differential spring 110 has returned member 102 to its original, extended position, it is necessary for the monitored pressure to drop to a safe level in order for lever 86 to rotate past the position which valve 134 opened before valve 134 can return to its seat. Therefore, the limits between which the lever can travel between the valve opening and the valve closing positions, and the magnitude of the monitored pressure differential, is adjustable by means of nut 108. Thus, if a large differential in the monitored pressure is desired, nut 108 is adjusted to allow spring 110 to expand so that a large lever travel will be required to unseat valve 134. Conversely, if it is desired to maintain the monitored pressure within narrow limits, nut 108 is adjusted to contract differential spring 110 so that the force required to unseat valve 134 will be built up with a small amount of lever travel.

While the device has been described heretofore as responding to an increase in pressure in chamber 32, it can be adapted to produce a signal upon a decrease in the monitored pressure. Formed on lever 86 on the opposite side of actuator stem 44 from ears 90 is a pair of apertured ears 146. When it is desired to adapt the device to transmit a signal upon a falling pressure, bracket 84 is shifted to the opposite side of actuating stem 44 and pivot pin 88 is inserted through ears 146. With the fulcrum of lever 86 now shifted to the opposite side of actuator stem 44, downward movement of actuator stem 44 causes counterclockwise rotation of lever 86.

As is readily seen, a decrease in the monitored pressure in chamber 32 causes actuator stem 44 to move downwardly. The resulting counterclockwise rotation of lever 86 in turn causes upward movement of the differential assembly 96. If the pressure in chamber 32 falls below the safe operating limit, actuator stem 44 will move downward until valve member 134 is unseated to vent the pressure in chamber 118 in the same manner as described above.

While a specific construction has been described, it will readily be apparent that various modifications and alterations can be made in the device without departing from the scope of the invention as defined in the appended claims.

We claim:
1. A snap-acting condition responsive pressure control device comprising a casing, a valve body mounted in said casing and having a fluid flow passage extending therethrough from a fluid inlet to a fluid outlet, check valve means in said passage having a valve seat facing said inlet and a valve member normally maintained in a closed position against said seat by fluid pressure at said inlet, said valve member being movable from said closed position to an open position spaced from said seat to open said passage to the flow of fluid therethrough with the fluid pressure substantially equalized across said valve member, a plunger slideably mounted in said valve body and operable upon movement in a first direction to move said valve member from said closed position to said open position, condition responsive means in said casing including an actuating member movable relative to said casing in proportional response to variations in a monitored condition, compression spring means engaged between said actuating member and said plunger exerting a resilient biasing force urging said plunger in said first direction, the resilient biasing force exerted on said plunger by said spring means being variable in dependence upon the position of said actuating member relative to said casing and being operable at a position of said actuating member corresponding to a predetermined magnitude of said monitored condition to overcome the fluid pressure force holding said valve member in said closed position to move said valve member rapidly to said open position.

2. A snap-acting pressure responsive pressure release device comprising a casing, a valve body mounted in said casing and having a fluid flow passage extending therethrough from a fluid inlet to a fluid outlet, check valve means in said passage having a valve seat facing said inlet and a valve member normally maintained in a closed position against said seat by fluid pressure at said inlet, said valve member being movable from said closed position to an open position spaced from said seat to open said passage to the flow of fluid therethrough with the fluid pressure substantially equalized across said valve member, first spring means in said valve body biasing said valve member toward said valve seat, a plunger slideably mounted in said valve body and operable upon movement in a first direction to move said valve member from said closed position to said open position, lever means pivotally supported in said casing, pressure responsive means in said casing coupled to said lever means for pivoting said lever means relative to said casing in proportional response to variations in pressure at said fluid inlet, second spring means coupling on said lever means to said plunger exerting a resilient biasing force urging said plunger in said first direction, the resilient biasing force exerted on said plunger by said second spring means being variable in dependence upon the pivotal position of said lever means relative to said casing and being operable at a pivotal position of said lever means corresponding to a predetermined pressure at said fluid inlet to overcome the fluid pressure force and the biasing force of said first spring means to move said valve member to said open position, said valve member being moved to said open position with a snap-action resulting from the release of the fluid pressure force from said valve member upon initial movement of said valve member from said closed position.

References Cited in the file of this patent

UNITED STATES PATENTS

| | | |
|---|---|---|
| 2,059,722 | Beck | Nov. 3, 1936 |
| 2,091,596 | Kluppel | Aug. 31, 1937 |
| 2,312,877 | Campbell | Mar. 2, 1943 |
| 2,718,239 | Erbguth | Sept. 20, 1955 |
| 3,021,865 | Beckett | Feb. 20, 1962 |